United States Patent
Keeler, Jr. et al.

(10) Patent No.: US 7,721,992 B2
(45) Date of Patent: May 25, 2010

(54) AIRCRAFT FLOOR TO FUSELAGE ATTACHMENT

(75) Inventors: Robert D. Keeler, Jr., Maryland Heights, MO (US); Albert L. Neal, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 581 days.

(21) Appl. No.: 11/683,228

(22) Filed: Mar. 7, 2007

(65) Prior Publication Data

US 2008/0217478 A1    Sep. 11, 2008

(51) Int. Cl.
*B64C 1/18* (2006.01)
(52) U.S. Cl. ........................... 244/119; 244/131
(58) Field of Classification Search ............ 244/131, 244/119, 120, 117 R, 118.1, 118.2, 118.5, 244/118.6; 454/76, 7; 114/76; 105/422; 52/169.9, 299, 633, 634, 639, 645
See application file for complete search history.

(56) References Cited

U.S. PATENT DOCUMENTS

| | | | | |
|---|---|---|---|---|
| 3,155,348 A | * | 11/1964 | Ricard | ........................ 244/119 |
| 4,033,247 A | * | 7/1977 | Murphy | ........................ 454/76 |
| 4,479,621 A | * | 10/1984 | Bergholz | .................. 244/117 R |
| 4,799,631 A | * | 1/1989 | Humphries et al. | ........ 244/118.5 |
| 5,806,797 A | * | 9/1998 | Micale | ........................ 244/120 |
| 5,871,178 A | | 2/1999 | Barnett | |
| 6,264,141 B1 | | 7/2001 | Shim et al. | |
| 7,338,013 B2 | * | 3/2008 | Vetillard et al. | .......... 244/117 R |
| 2007/0176048 A1 | * | 8/2007 | Huber et al. | .................. 244/119 |
| 2008/0105785 A1 | * | 5/2008 | Griess et al. | .................. 244/120 |

FOREIGN PATENT DOCUMENTS

| DE | 3141869 A1 | 5/1983 |
|---|---|---|
| GB | 2072116 A | 9/1981 |

* cited by examiner

*Primary Examiner*—Michael R Mansen
*Assistant Examiner*—Joshua J Michener
(74) *Attorney, Agent, or Firm*—Felix L. Fischer

(57) ABSTRACT

A floor to fuselage attachment structure incorporates a truss having an upper angled attachment engaging the floor proximate an edge and extending at an angle upward from the floor edge to attach to the fuselage. Additionally, the truss includes a lower angled attachment engaging the floor proximate the edge and extending at an angle downward to attach to the fuselage. The upper and lower angled attachments support the floor with the edge spaced from the fuselage and further have a plurality of apertures for providing airflow between a first volume above the floor and a second volume below the floor.

18 Claims, 15 Drawing Sheets

US 7,721,992 B2

AIRCRAFT FLOOR TO FUSELAGE ATTACHMENT

BACKGROUND

1. Field of the Invention

This invention relates generally to the field of structural architecture for aircraft, and more particularly, to an attachment structure to support a floor substructure to a fuselage with venting for pressure equalization.

2. Description of the Related Art

Attachment of a honeycomb floor structure to a honeycomb aircraft fuselage requires distribution of the loads through the honeycomb structure to avoid load concentrations and the ability to provide adequate equalization venting between the passenger compartment and the cargo bay in the event of rapid decompression in either of the compartments. Extension inboard is constrained by passenger cabin interior fascia, window seat and passenger foot rest area; therefore this structure must occupy a minimal amount of space for design efficiency.

In current aircraft applications the floor is tied directly to the fuselage wall using a traditional "pi" type fitting. This structural architecture places too high a tear off load on the bond between the pi fitting and the honeycomb fuselage wall.

Typical aircraft utilize independent features or structures for addressing the decompression venting and the load distribution between the floor and fuselage wall. It is therefore desirable to provide unique structural designs that incorporate load distribution between the floor and the fuselage wall in a minimal amount of space and yet provide for decompression venting.

SUMMARY

In exemplary embodiments the floor to fuselage attachment structure incorporates a truss having an upper angled attachment engaging the floor proximate an edge and extending at an angle upward from the floor edge to attach to the fuselage. Additionally, the truss includes a lower angled attachment engaging the floor proximate the edge and extending at an angle downward to attach to the fuselage. The upper and lower angled attachments support the floor with the edge spaced from the fuselage and further have a plurality of apertures for providing airflow between a first volume above the floor and a second volume below the floor.

In various embodiments, the angled attachments in the truss each employ a web containing the plurality of apertures with a connection feature extending from a first edge of the web and engaging a top surface of the floor proximate the edge and a second connection feature extending from a second edge of the web and engaging an inner surface of the fuselage. The connection feature connecting to the fuselage is typically a flange attached to the web at a predetermined angle for engaging the fuselage inner surface. The connection feature engaging the floor for various embodiments is a horizontal plate extending from the web of the upper and lower angled attachment or a channel engaging both webs.

BRIEF DESCRIPTION OF THE DRAWINGS

These and other features and advantages of the present invention will be better understood by reference to the following detailed description when considered in connection with the accompanying drawings wherein.

DETAILED DESCRIPTION

Figure 1:
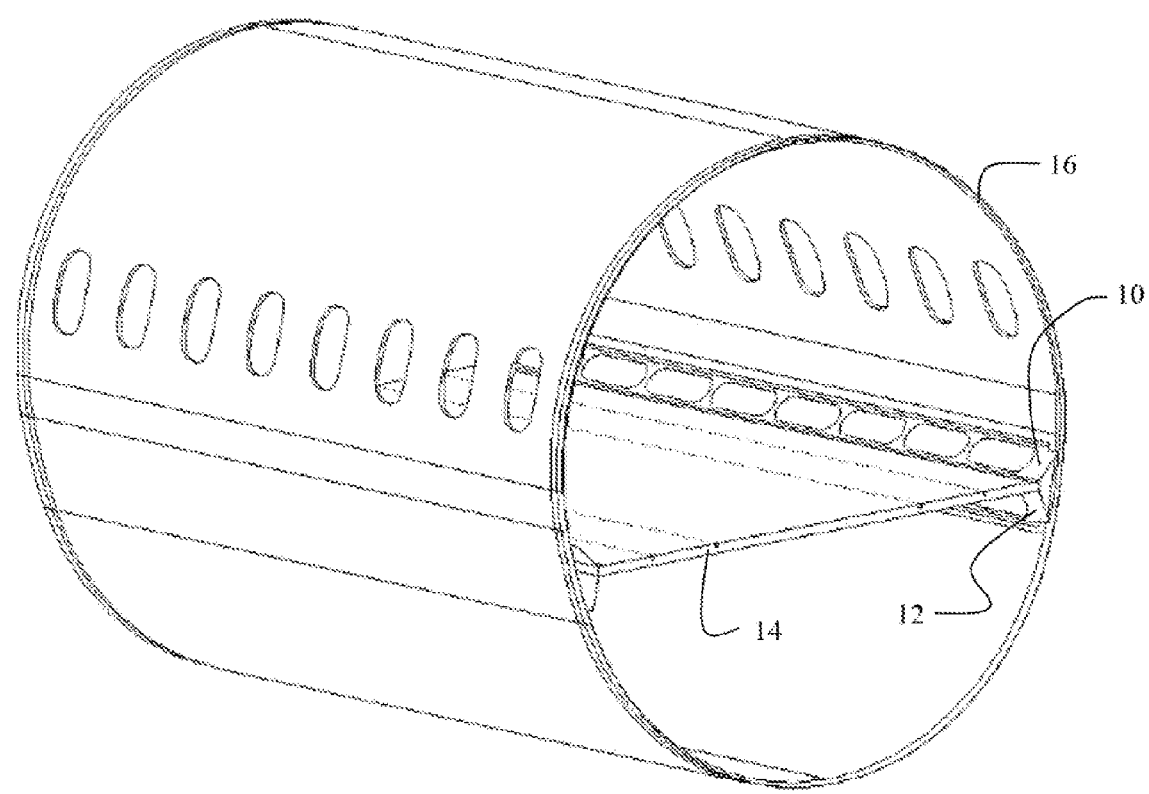
FIG. 1 is an isometric view of a fuselage section incorporating one embodiment of the present invention.
Figure 2:
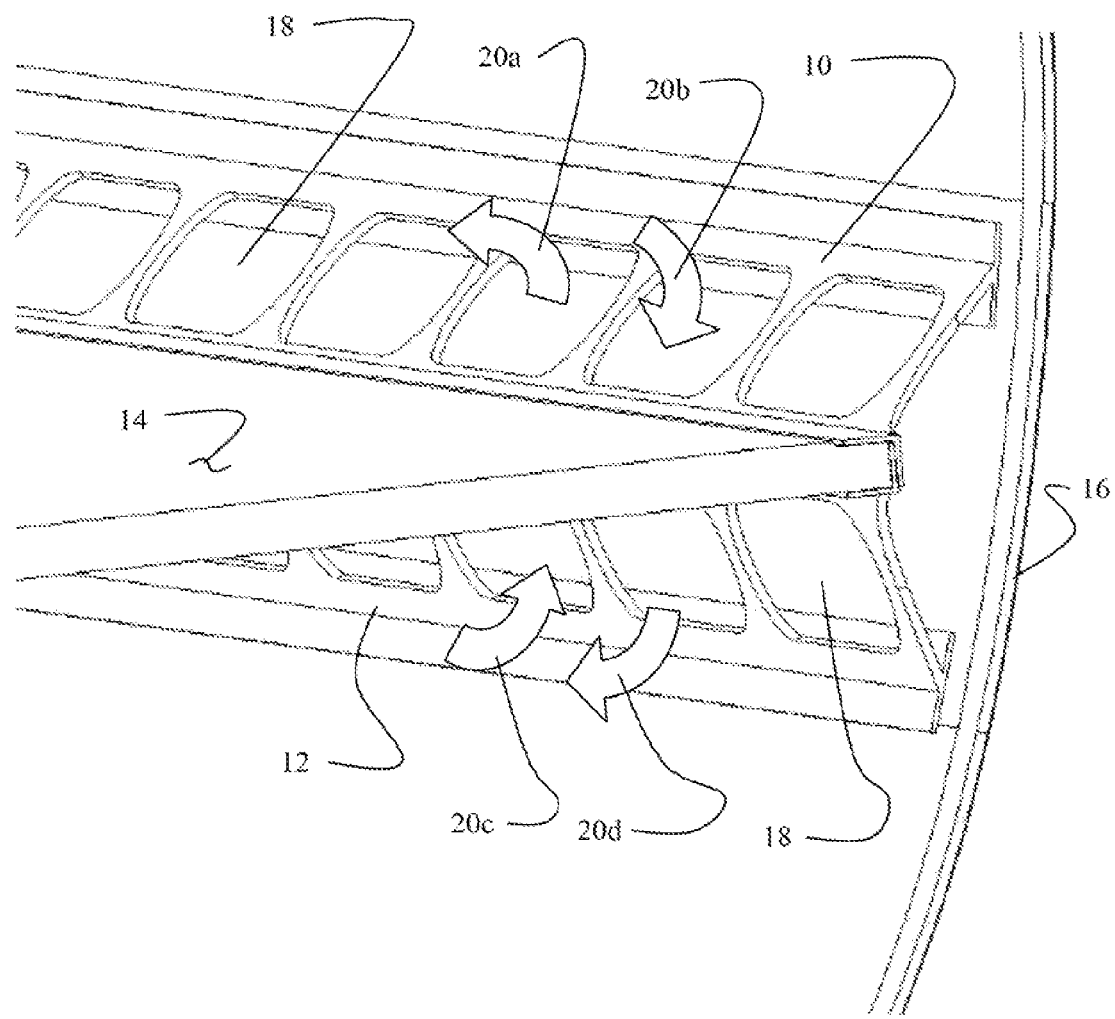
FIG. 2 is a partial pictorial view of the embodiment of FIG. 1 demonstrating venting capability.

As shown for a first embodiment in FIG. 1, a truss having upper and lower angled attachments 10 and 12 is employed to split and distribute the load path from a honeycomb floor 14 into a honeycomb fuselage 16 while providing the largest gap between floor and fuselage structure in a minimum amount of space. As seen in FIG. 2, the angled attachments have integral vent holes 18 that can equal the area of the gap between floor and fuselage to allow equalization of pressure in the passenger and cargo compartments, as represented by flow arrows 20a-20d, if decompression occurred in either of the compartments. The angled attachments are suitably sized to allow some flexure between floor and fuselage wall. The fuselage wail bulges under cabin pressure and needs the floor to help retain its shape. This attachment arrangement while described for the embodiments herein with honeycomb floor to honeycomb fuselage joints is applicable to either metallic or composite floor to fuselage joints as well as.

This floor to fuselage wall attachment consists of multiple components that transfer load between floor and fuselage wall. The actual number and arrangement of attachment components can vary according to the floor configuration with a general structural configuration providing two angled webs going from the floor to the fuselage wall using various end arrangements to attach to the floor and fuselage wall. The optimum angle at which the upper and lower attachment angles run from floor to wall is determined by strength requirements through the joint and hole area required for venting from one compartment to the other.

Figure 3:
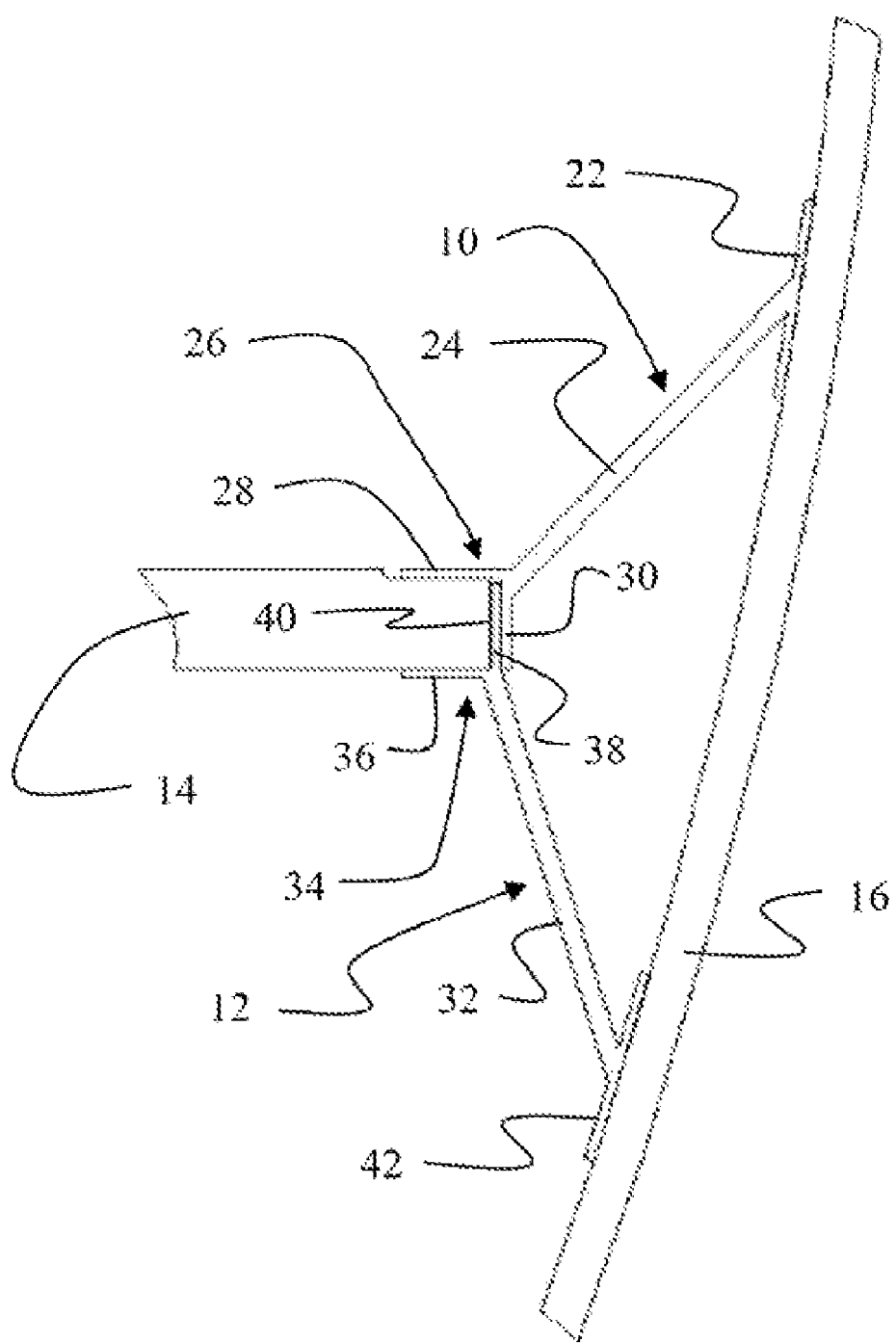
FIG. 3 is a detail section view of the first embodiment.
Figure 4:
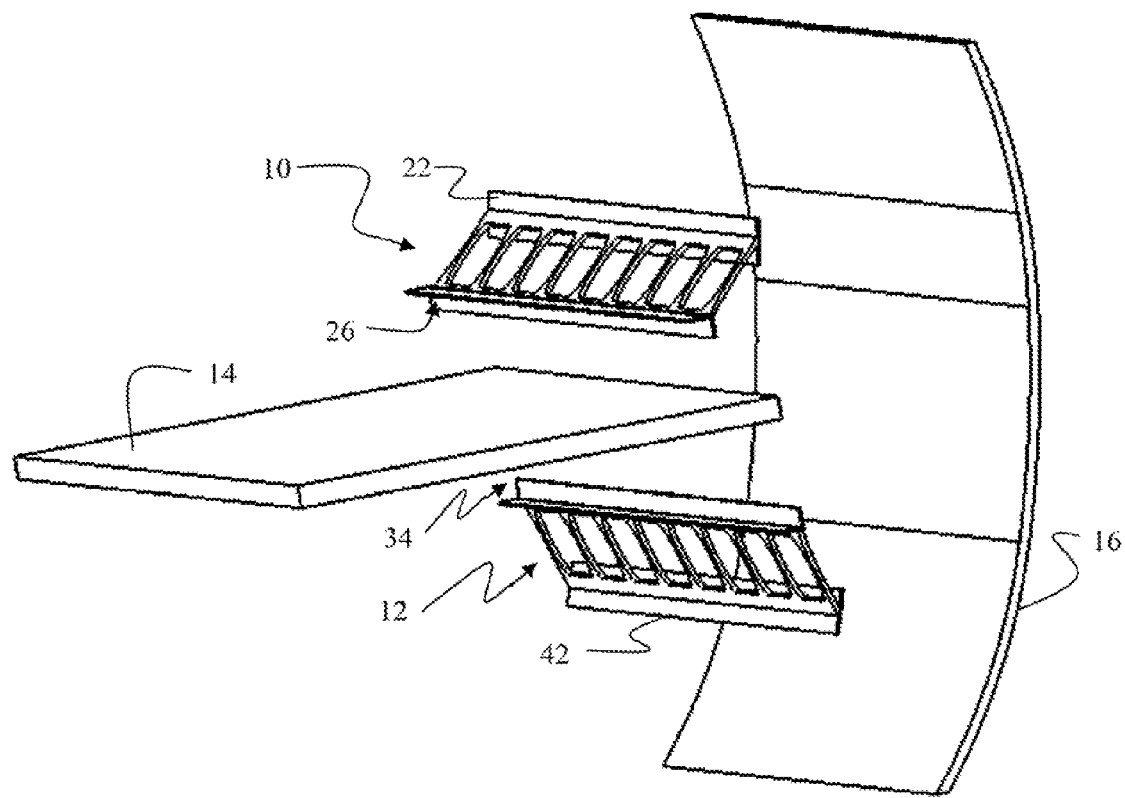
FIG. 4 is an isometric exploded, view of the first embodiment elements shown in FIG. 3.

In both the upper and lower angled webs, there are features for attachment to the fuselage wall and the floor. As shown in FIG. 3 for the first embodiment, a first feature on the upper element is an attachment flange 22 that attaches the angled web 24 to the fuselage wall using a 2-part epoxy or alternatively incorporating fasteners. The second feature is an angled fitting 26 that incorporates a horizontal plate 28 which attaches to the floor and a butt plate 30. The angled webs can run the entire length of a fuselage barrel section or segmented for manufacturing, strength or compartment configuration reasons. Similarly for the lower attachment element with web 32 a nesting angled fitting 34 has a horizontal plate 36 which attaches to the bottom of the floor and a butt plate 38 which extends between the floor edge 40 and the butt plate on the upper angled fitting. Attachment flange 42 connects the lower web to the fuselage wall as described for the upper attachment flange. An exploded view of the elements of this embodiment is shown in FIG. 4.

Variations of this attachment in alternative embodiments, described in greater detail subsequently include incorporating one or both of the angles into the face sheets of the composite honeycomb floor; providing separate upper and lower metal or composite angles with flanges to support and/or position floor in the fuselage barrel; and including separate metallic or composite webs which use pi ($\pi$) shaped edge components or angles to bond or fasten to floor and/or fuselage wall.

An important feature of each of these arrangements is a hole pattern in the web that allows a non point load distribution between floor and fuselage wall as well as adequate air passage between compartments for equalizing air pressure on structural components in the advent of rapid decompression in one of the compartments. The size, shape and number of holes are determined by strength and venting requirements of the specific aircraft.

Figure 5:
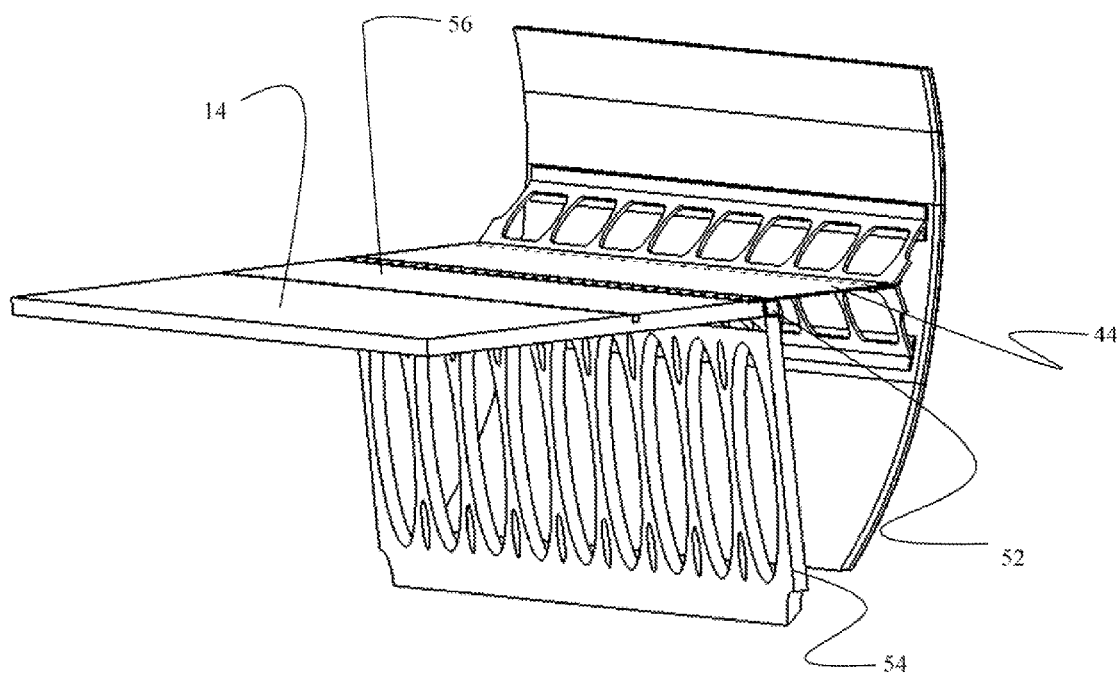
FIG. 5 is a partial pictorial view of a second embodiment incorporating the invention.
Figure 6:
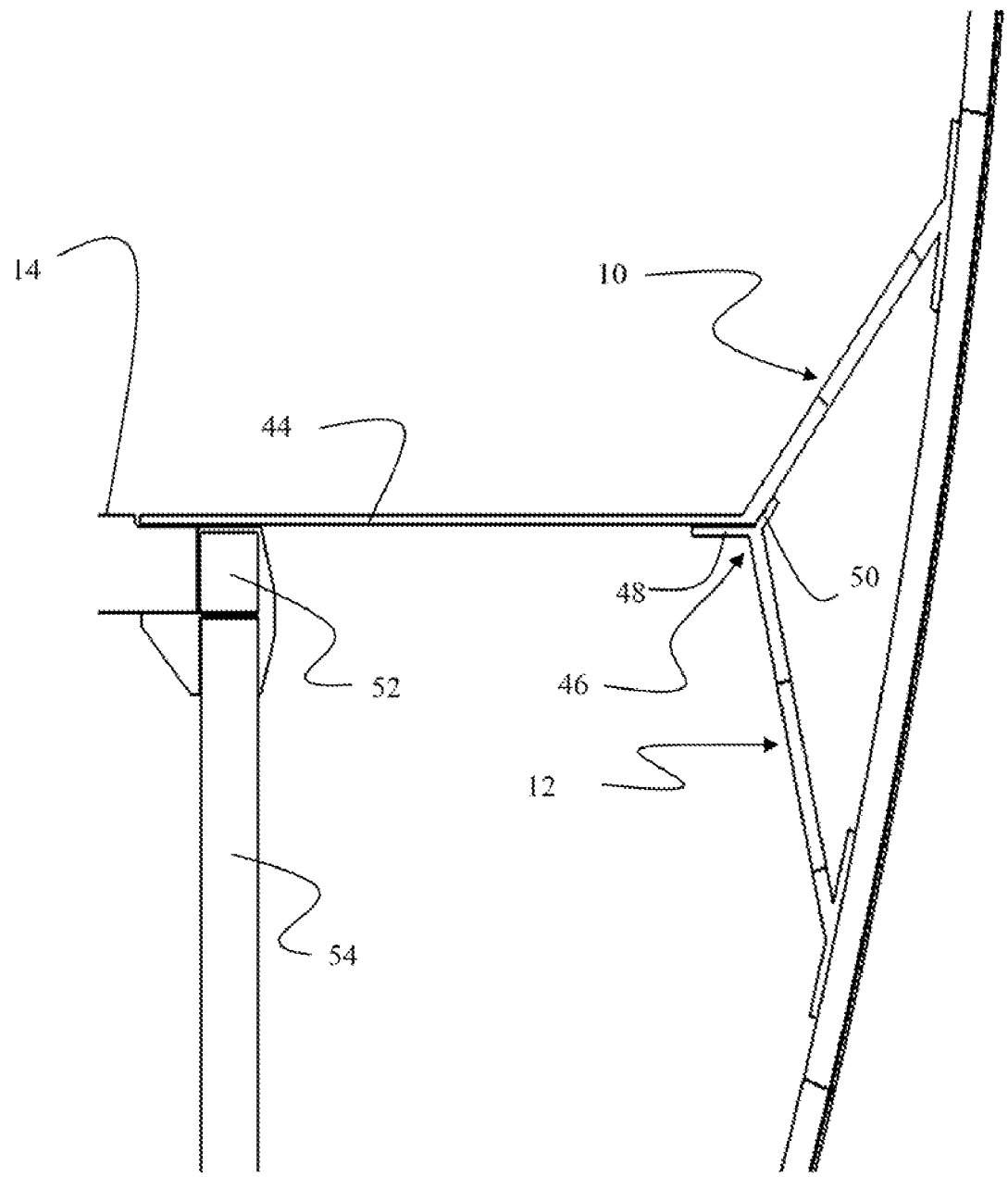
FIG. 6 is a detail section view of the second embodiment.

FIGS. 5 and 6 show a second embodiment of the novel structure with upper element 10 having an extended horizontal floor attachment plate 44 and lower element 12 having an angle support 46 with a horizontal engagement flange 48 connected to the horizontal floor attachment plate. Angled crook 50 provided as a portion of the support engages the web of the upper element for additional rigidity. The composite floor box 14 is connected to the attachment plate at an edge member 52 which also engages a vertical support 54 which carries a portion of the vertical loading on the floor while the horizontal floor attachment plate reacts tension forces from the fuselage during pressurization as previously described. The upper surface 56 of the floor box merges into a continuous horizontal surface with the attachment plate.

Figure 7:
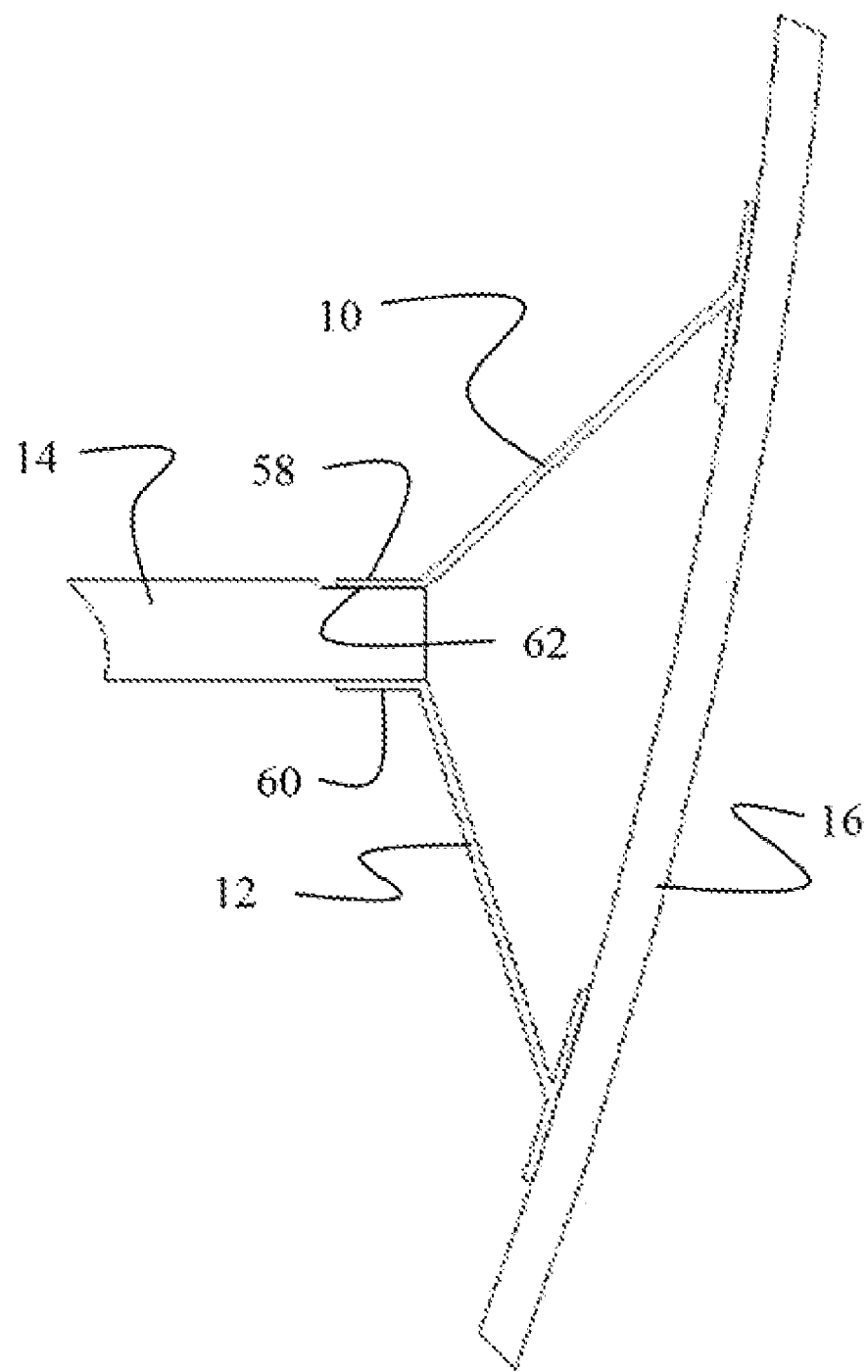
FIG. 7 is a detail section view of a third embodiment.
Figure 8:
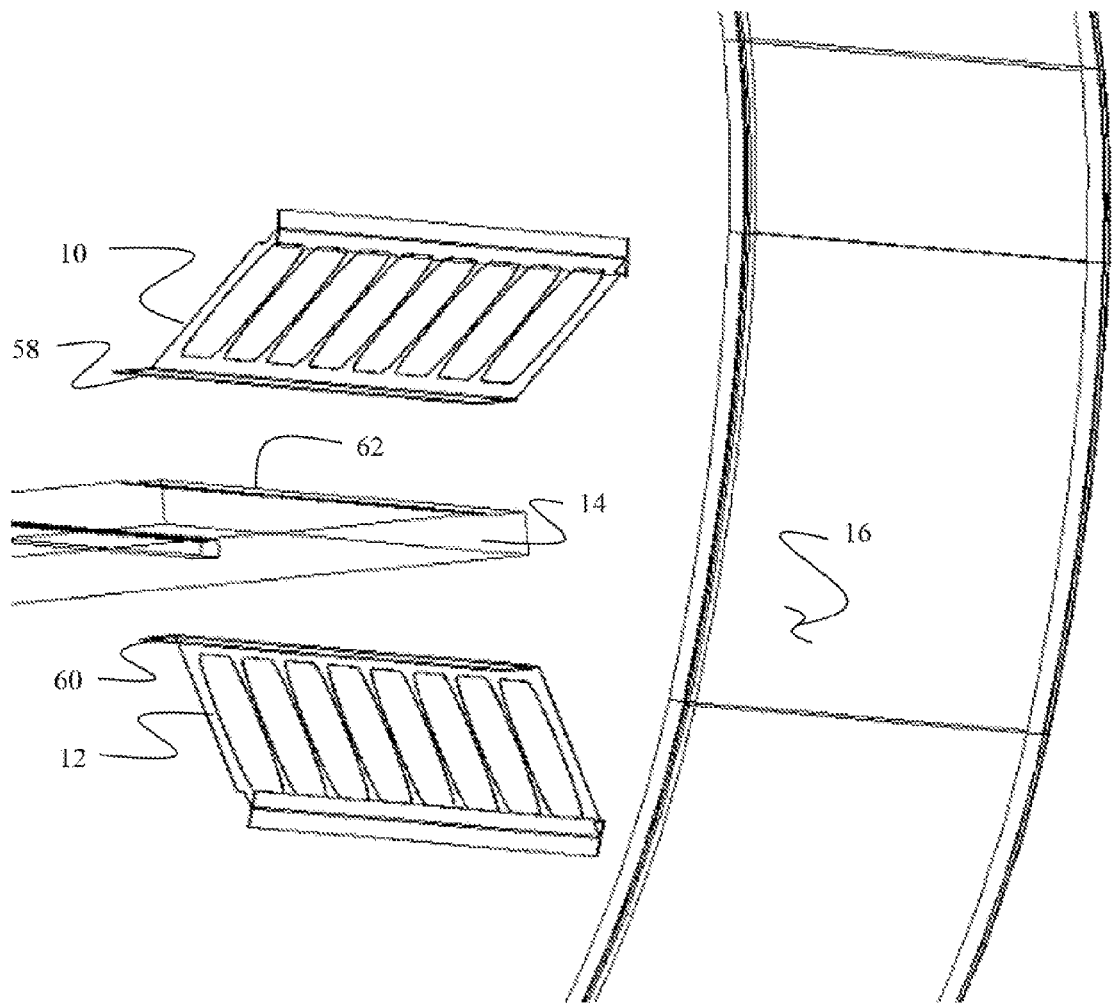
FIG. 8 is an exploded isometric view of the elements of the third embodiment of FIG. 7.

FIGS. 7 and 8 show a third embodiment employing horizontal engagement flanges 58, 60 on both the upper and lower element to connect to the floor box 14. For the embodiment as shown, the upper engagement flange is received in a recess 62 in the floor box to provide a flat floor surface.

Figure 9:
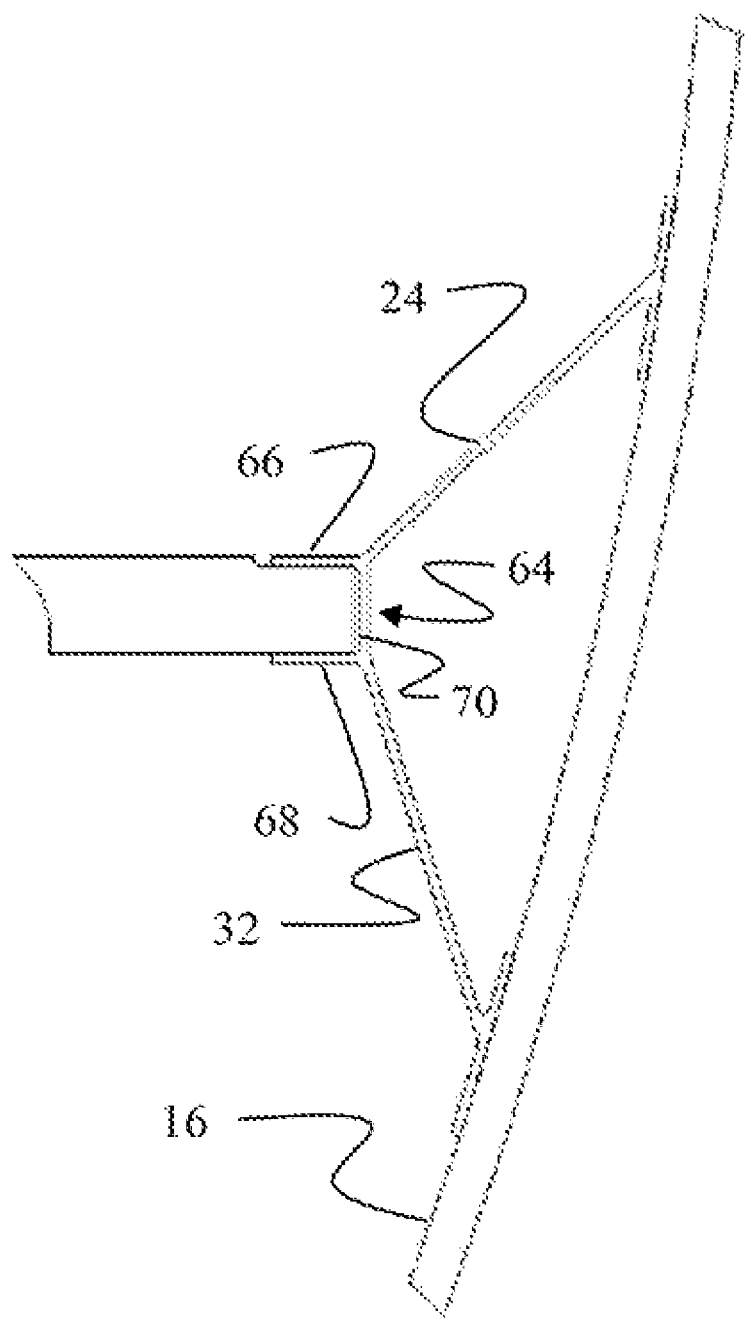
FIG. 9 is a detail section view of a fourth embodiment.
Figure 10:
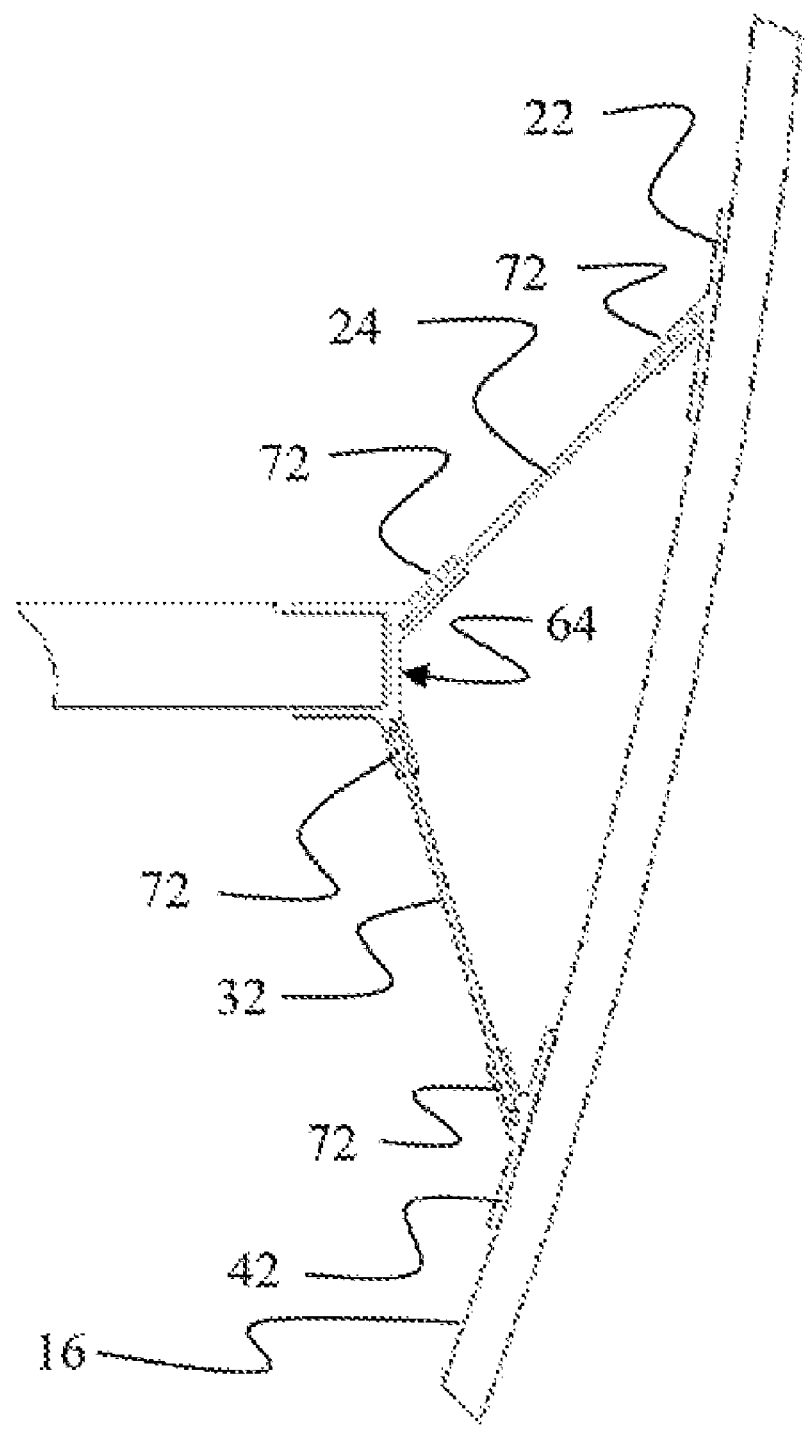
FIG. 10 is a detail section view of a fifth embodiment.
Figure 11:
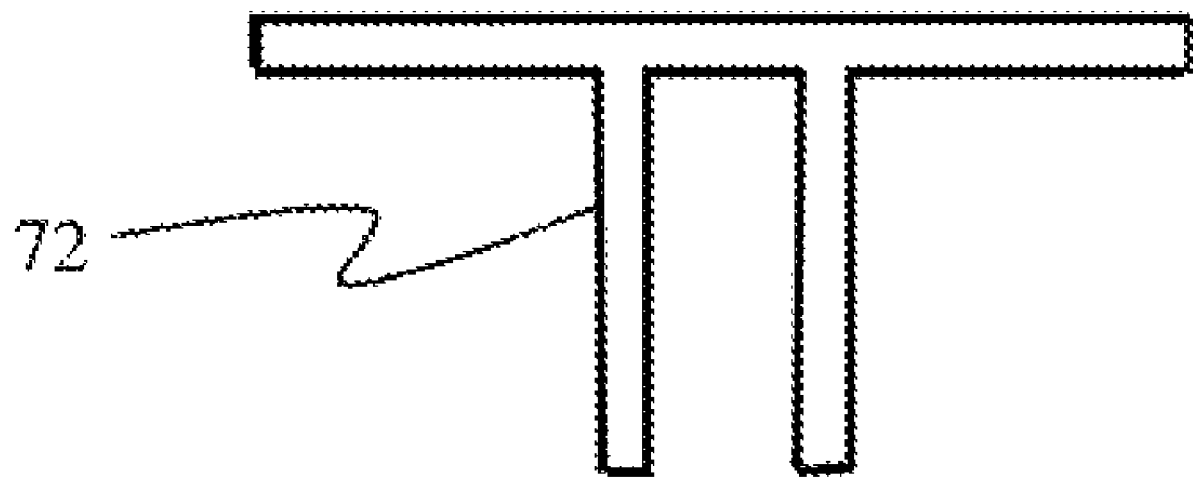
FIG. 11 is a section view of an exemplary pi fitting.
Figure 12:
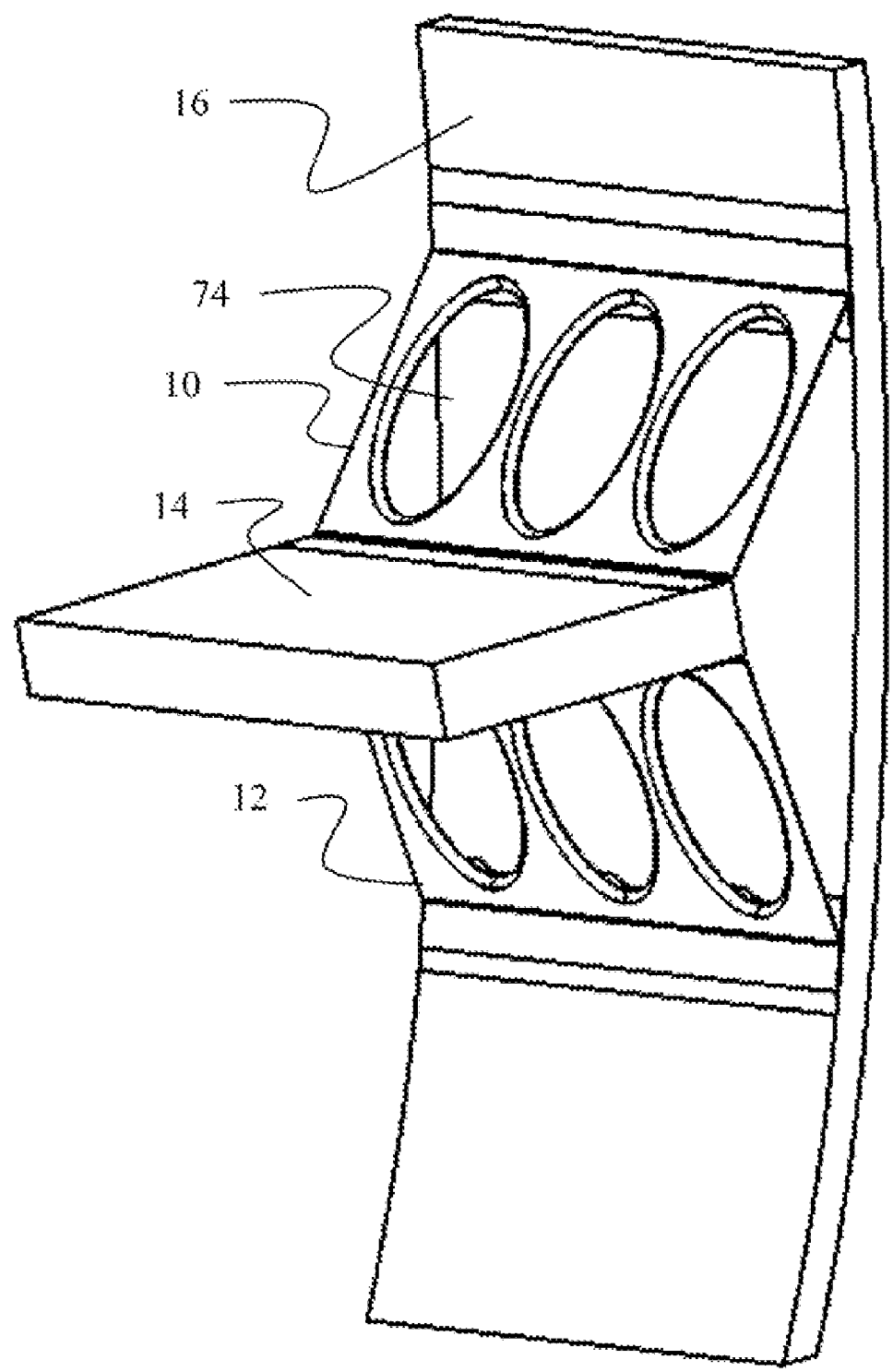
FIG. 12 is a partial pictorial view of a sixth embodiment with alternative vent shape.
Figure 13:
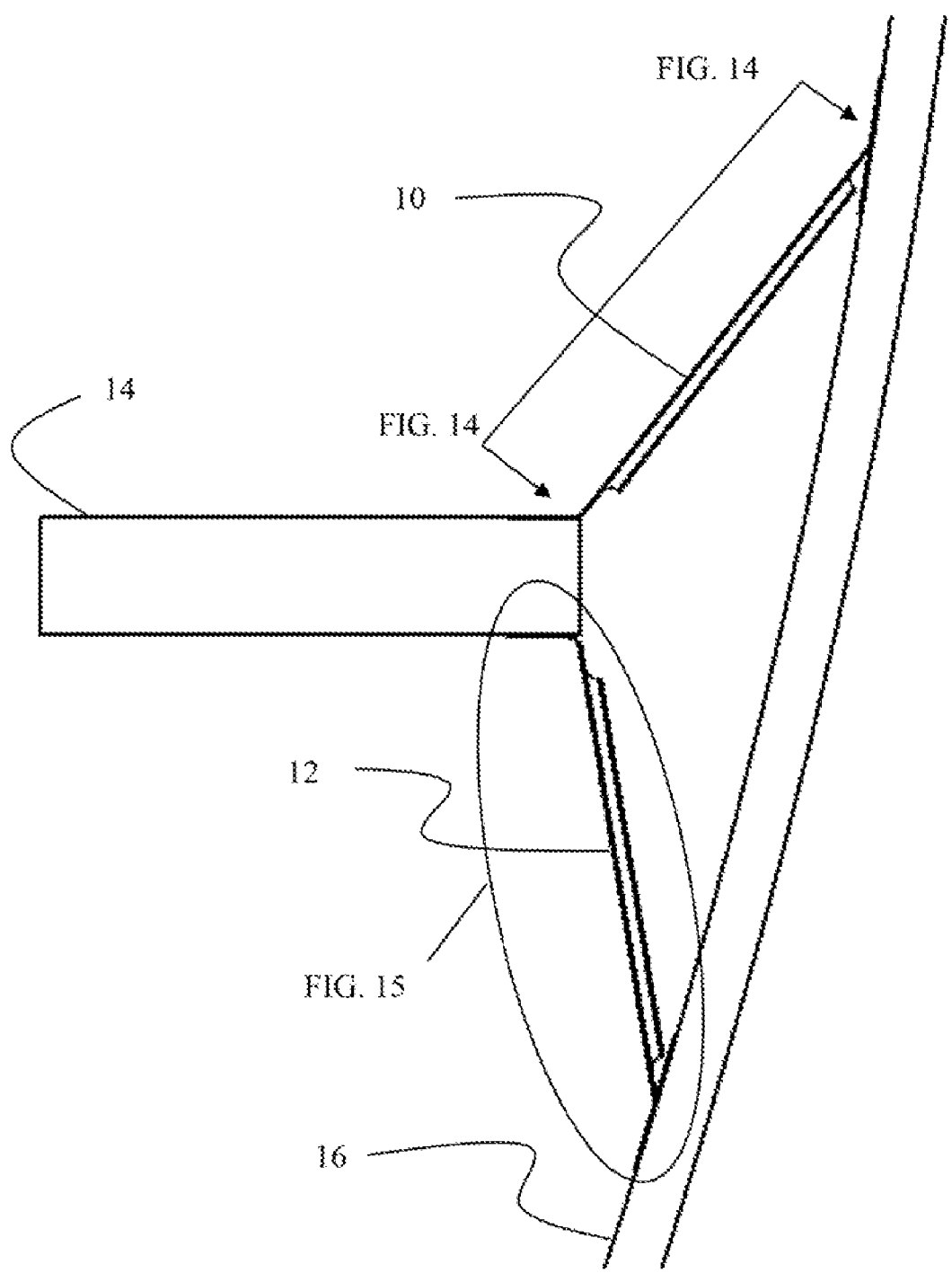
FIG. 13 is a detail section view of the elements of the sixth embodiment.
Figure 14:
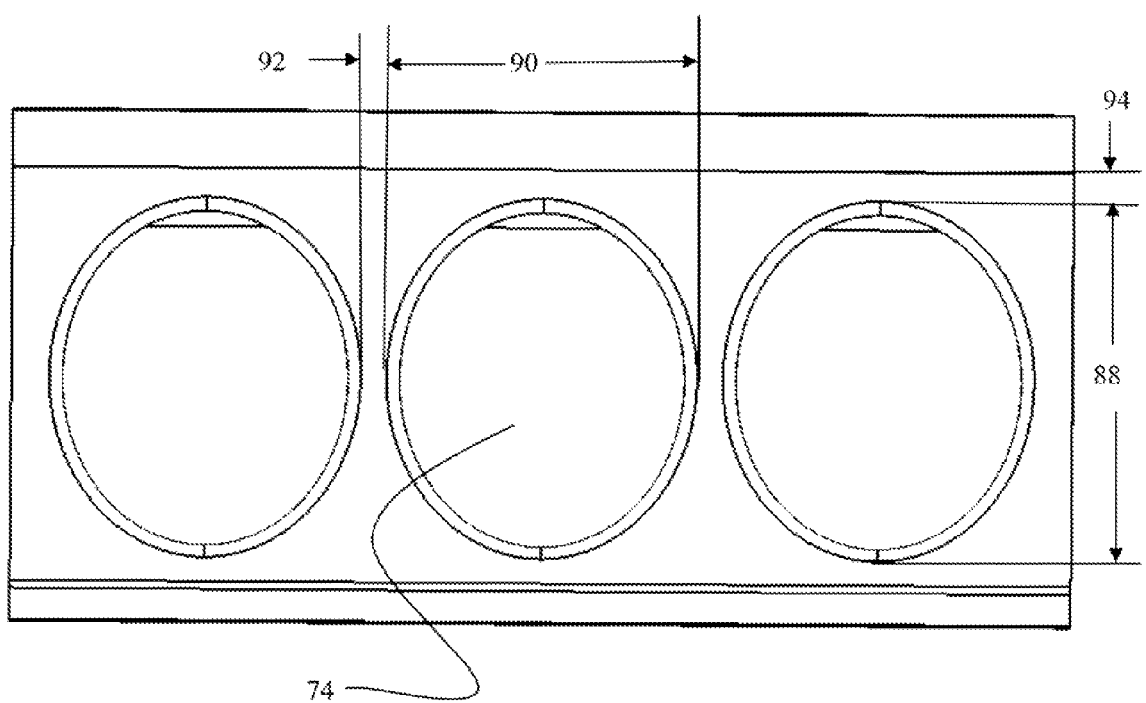
FIG. 14 is a detail view of the vent apertures.
Figure 15:
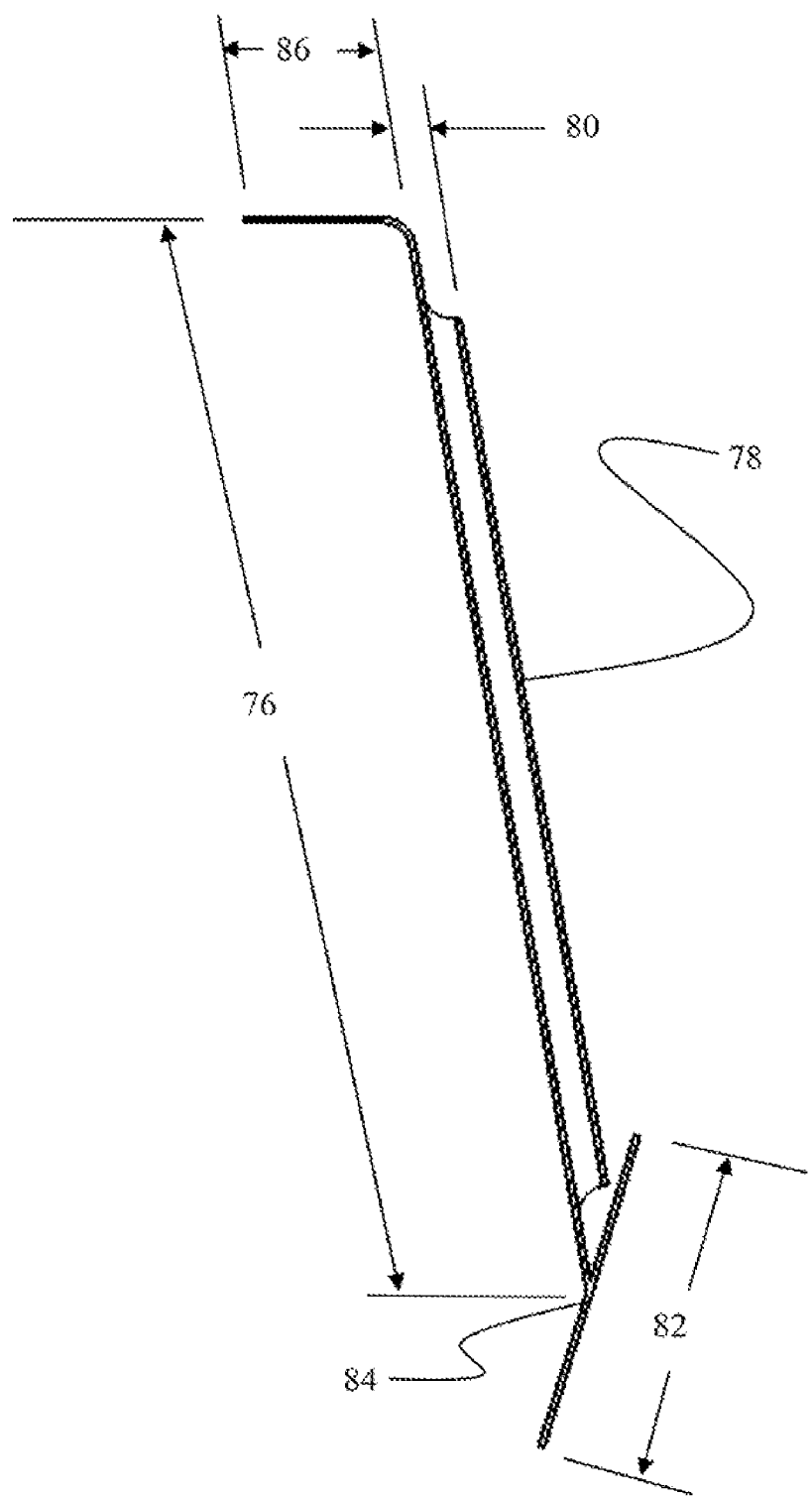
FIG. 15 is a detail section of one support element.

FIG. 9 discloses a fourth embodiment incorporating features from the first and third embodiments with the lower end of the upper element and the upper end of the lower element terminating in a channel 64 providing horizontal upper and lower attachment flanges 66, 68 with a vertical buttressing plate 70 to receive the floor box end. Attachment of webs 24, 32 to the connection elements is altered in various embodiments with a single integrated piece shown for the embodiment of FIGS. 7 and 8. An alternative embodiment is shown in FIG. 10 with modified Pi fittings 72 employed to attach the web to the channel and upper and lower attachment flanges. The angle of the legs for the pi fittings accommodates the appropriate geometry for the elements as a whole while allowing very simple web structure. An un-angled (perpendicular) pi fitting is shown in FIG. 11 as a reference.

As previously described, the hole pattern for the web in the upper and lower elements allows communication between the cargo hold and passenger compartment. In FIGS. 12-15 an embodiment is shown with an exemplary elliptical hole 74 employed in the pattern, in the example embodiment for an aircraft application having a 2.5" thick honeycomb composite floor and a 1.0" thick honeycomb composite fuselage wall with a nominal radios of 80.0 inches, the upper and lower elements have a length 76 of approximately 10" formed from 0.050" thick 6Al 4V Titanium with bend radius on the formed elements of 0.25". A die forming process provides a flange 78 perpendicularly extending from the web a distance 80 of approximately 0.35" for greater rigidity. The upper and lower fuselage attachment flanges have a width 82 of approximately 3" and are welded to the web with, full penetration welds 84 at a preselected angle for flush engagement with the fuselage inner surface. The horizontal engagement flanges have a length 86 of 1.5" and are bonded to the floor. The elliptical holes in the pattern each, have a major axis 88 of 8.0" with a minor axis 90 of 6.5" with a separation of holes 92 of 1.5" and separation 94 of 1.0" from each edge of the web.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An apparatus for aircraft fuselage to floor connection comprising:
    a truss having
        an upper angled attachment engaging a floor proximate an edge and extending to attach to a fuselage, and
        a lower angled attachment engaging the floor proximate the edge and extending to attach to the fuselage,
    the upper and lower angled attachments supporting the floor with the edge spaced from the fuselage and further having a plurality of apertures therein providing airflow between a first volume above the floor and a second volume below the floor.

2. An apparatus for aircraft fuselage to floor connection as defined in claim 1 wherein the upper angled attachment further comprises:
    a web having a first plurality of apertures from said plurality of apertures;
    a first connection feature extending from a first edge of the web and engaging a top surface of the floor proximate the edge;
    a second connection feature extending from a second edge of the web and engaging an inner surface of the fuselage.

3. An apparatus for aircraft fuselage to floor connection as defined in claim 2 wherein the lower angled attachment further comprises:
    a second web having a second plurality of apertures from said plurality of apertures;
    a third connection feature extending from a first edge of the second web and engaging a bottom surface of the floor proximate the edge;
    a fourth connection feature extending from a second edge of the second web and engaging an inner surface of the fuselage.

4. An apparatus for aircraft fuselage to floor connection as defined in claim 3 wherein the first connection feature incorporates a first butt plate depending downward along the floor edge and the third connection feature incorporates a second butt plate extending upward intermediate the floor edge and the first butt plate.

5. An apparatus for aircraft fuselage to floor connection as defined in claim 3 wherein the second and fourth connection features each comprise a flange connected to a second edge of the first and second webs and attached to the fuselage inner surface.

6. An apparatus for aircraft fuselage to floor connection as defined in claim 5 wherein the webs and flanges are titanium and the flanges are full penetration welded to the webs at an angle to provide flush engagement with the fuselage inner surface.

7. An apparatus for aircraft fuselage to floor connection as defined in claim 1 wherein the upper angled attachment incorporates a first web and the lower angled attachment incorporates a second web, the first and second web attached to a channel receiving the floor edge for engagement.

8. An apparatus for aircraft fuselage to floor connection comprising:
a truss having
an upper angled attachment connected to a fuselage and terminating in a horizontal plate engaging a floor proximate an edge, and
a lower angled attachment connected to the fuselage and terminating at an angle brace engaging the horizontal plate;
the upper and lower angled attachments supporting the floor with the edge spaced from the fuselage and further having a plurality of apertures therein providing airflow between a first volume above the floor and a second volume below the floor.

9. An apparatus for aircraft fuselage to floor connection as defined in claim 8 wherein the plate provides an extension of an upper surface of the floor from the edge and further comprising a vertical support connected to the floor proximate the edge.

10. An aircraft structure comprising:
a fuselage;
a floor carried within the fuselage;
an upper angled attachment engaging the floor proximate an edge and extending to attach to the fuselage above the floor;
a lower angled attachment engaging the floor proximate the edge and extending to attach to the fuselage below the floor;
said upper and lower angles attachments supporting the floor with the edge spaced from the fuselage and further having a plurality of apertures therein providing airflow between a first volume above the floor and a second volume below the floor.

11. An aircraft structure as defined in claim 10 wherein the upper angled attachment further comprises:
a web having a first plurality of apertures from said plurality of apertures;
a first connection feature extending from a first edge of the web and engaging a top surface of the floor proximate the edge;
a second connection feature extending from a second edge of the web and engaging an inner surface of the fuselage.

12. An aircraft structure as defined in claim 11 wherein the lower angled attachment further comprises:
a second web having a second plurality of apertures from said plurality of apertures;
a third connection feature extending from a first edge of the second web and engaging a bottom surface of the floor proximate the edge;
a fourth connection feature extending from a second edge of the second web and engaging an inner surface of the fuselage.

13. An aircraft structure as defined in claim 12 wherein the first connection feature incorporates a butt plate depending downward along the floor edge and the third connection feature incorporates a second butt plate extending upward intermediate the floor edge and the first butt plate.

14. An aircraft structure as defined in claim 12 wherein the second and fourth connection features each comprise a flange connected to a second edge of the first and second webs and attached to the fuselage inner surface.

15. An aircraft structure as defined in claim 14 wherein the webs and flanges are titanium and the flanges are full penetration welded to the webs at an angle to provide flush engagement with the fuselage inner surface.

16. An aircraft structure as defined in claim 10 wherein the upper angled attachment incorporates a first web and the lower angled attachment incorporates a second web, the first and second web attached to a channel receiving the floor edge for engagement.

17. A method for supporting a floor in the fuselage of an aircraft comprising the steps of:
providing an upper attachment having a plurality of apertures therein;
engaging a floor proximate an edge at a first end of the upper attachment;
engaging a fuselage above a plane of the floor at a second end of the upper attachment, the upper attachment angled to space the edge of the floor from the fuselage;
providing a lower attachment having a plurality of apertures therein;
engaging the floor proximate the edge at a first end of the lower attachment;
engaging the fuselage below the plane of the floor at a second end of the lower attachment, the lower attachment angled to space the edge of the floor from the fuselage; and
wherein said upper attachment plurality of apertures and said lower attachment plurality of apertures provide airflow between a first volume above the floor and a second volume below the floor.

18. A method for supporting a floor in the fuselage of an aircraft as defined in claim 17 wherein the steps of engaging the floor each comprise the steps of:
attaching a flange to the second end of the attachment at an angle for flush engagement with an inner surface of the fuselage; and
attaching the flange to the inner surface.

* * * * *